(12) United States Patent
Reichow et al.

(10) Patent No.: US 7,113,081 B1
(45) Date of Patent: Sep. 26, 2006

(54) VEHICLE LOAD WARNING SYSTEM

(75) Inventors: Keith Reichow, Kent, WA (US); Pat Ryan, Buckley, WA (US); Bill Zimmerman, Seattle, WA (US); John Hoffman, Lynnwood, WA (US); Lee Schwartz, Bellevue, WA (US)

(73) Assignee: Stress-Tek, Inc., Kent, WA (US)

( * ) Notice: Subject to any disclaimer, the term of this patent is extended or adjusted under 35 U.S.C. 154(b) by 79 days.

(21) Appl. No.: 10/816,430

(22) Filed: Apr. 1, 2004

Related U.S. Application Data

(60) Provisional application No. 60/459,699, filed on Apr. 1, 2003.

(51) Int. Cl.
*B60Q 1/00* (2006.01)

(52) U.S. Cl. ............... 340/440; 340/665; 340/666; 340/667; 340/425.5; 340/438; 340/686.1

(58) Field of Classification Search ......... 340/440, 340/665, 666, 667, 425.5, 438, 686.1; 177/136, 177/137, 141, 184, 186; 180/290, 905
See application file for complete search history.

(56) References Cited

U.S. PATENT DOCUMENTS

| | | | |
|---|---|---|---|
| 3,531,766 A | 9/1970 | Henzel | |
| 4,727,352 A * | 2/1988 | Doller | 340/440 |
| 4,789,033 A | 12/1988 | Dohrmann | |
| 4,812,806 A * | 3/1989 | Freeman | 340/440 |
| 5,376,760 A * | 12/1994 | Horsley | 177/137 |
| 5,522,468 A | 6/1996 | Dohrmann et al. | |
| 5,844,474 A * | 12/1998 | Saling et al. | 340/440 |
| 6,259,041 B1 | 7/2001 | Dohrmann | |
| 2004/0032323 A1* | 2/2004 | Nommensen | |

* cited by examiner

*Primary Examiner*—Hung Nguyen
(74) *Attorney, Agent, or Firm*—Perkins Coie, LLP

(57) ABSTRACT

A load warning system for use with a vehicle having a load-support portion, a frame, and a vehicle-support portion movably coupled to the frame. The system has an engagement portion mountable to the vehicle-support portion or the frame and is movable therewith as a unit. A load indicator is mountable to the other one of the vehicle-support portion or the frame, and is spaced apart from the engagement portion when in a first position. The load indicator moves to a second position and engages the engagement portion when the frame moves a selected distance in response to the load applied to the load-support portion. The load indicator provides a signal upon being moved to the second position. A warning indicator is coupled to the load indicator and provides an improper load warning to a user in response to the signal from the load indicator.

52 Claims, 6 Drawing Sheets

VEHICLE LOAD WARNING SYSTEM

CROSS-REFERENCE TO RELATED APPLICATION(S)

The present application claims priority from U.S. Provisional Patent Application No. 60/459,699, filed on Apr. 1, 2003, which is hereby incorporated in its entirety by reference thereto.

TECHNICAL FIELD

The present invention is directed to load warning systems, and more particularly to load warning systems for vehicles.

BACKGROUND

Vehicles, such as trucks, typically have maximum load ratings set by the vehicle manufacturer. Many vehicles have payload areas that can be loaded with a payload that could exceed the maximum load rating. The payload areas can also be improperly loaded with a payload even though the payload doesn't exceed the maximum load rating for the vehicle. For example, a payload below the maximum load rating could be located too far to one side or too far to the rear, thereby changing the handling or steering characteristics of the vehicle. It is highly desirable to provide a warning system that indicates when a vehicle is improperly loaded.

Prior systems have been designed to accurately measure the payload weight or axle weight. Most of these systems use load cells to support the weight and provide an electrical signal indicative of the weight. Some systems have relied on the deflection of the vehicle's suspension to provide an indication of load. As an example, U.S. Pat. No. 3,531,766 to Henzel discloses such a sensing system for overload indication. U.S. Pat. Nos. 4,789,033; 5,522,468; and 6,259,041 B1 to Dohrmann show various systems that translate suspension travel into motion that can be measured. The sensor output is sent to a display unit that gives an indication of weight. These prior art systems, while detecting weight, have limitations in determining or detecting improper load conditions in a vehicle.

SUMMARY

The present invention provides a load warning system that overcomes drawbacks experienced in the prior art and that provides additional benefits. Under one aspect of the invention, a load warning system is provided for use with a vehicle. The vehicle has a load-support portion adapted to receive a load thereon. A first portion of the vehicle, such as a frame, is coupled to the load-support portion. A second portion of the vehicle, such as an axle or suspension system, is movable relative to the first portion upon application of the load onto the load-support portion. The load warning system has an engagement portion mountable to and movable with the one of the first portion or second portion of the vehicle as a unit.

A load indicator is mountable to the other one of the first portion or second portion of the vehicle. The load indicator is configured to be spaced apart from the engagement portion and to be in a first position when the load on the load-support portion is less than a maximum load. The load indicator is also configured to engage the engagement portion and move to a second position when the load on the load-support portion is greater than a maximum load. The load indicator provides a signal upon being moved to the second position. A warning indicator is coupled to the load indicator to receive the signal and to provide an overload warning to a user upon receiving the signal.

Under another aspect of the invention, a load warning system has an engagement portion movable with a vehicle's frame or a vehicle-support portion. A load indicator is coupled to the other one of the vehicle-support portion or the frame. The load indicator is spaced apart from the engagement portion when in a first position. The load indicator is configured to move to a second position and engage the engagement portion when the load applied to the load-support portion exceeds a first maximum load. The load indicator is also configured to move to the second position and engage the engagement portion when the load applied to the load-support portion exceeds a second maximum load less than the first maximum load and when the load is positioned rearward of the load indicator or the engagement portion. A warning indicator is coupled to the load indicator and configured to provide an overload warning to a user in response to the load indicator moving to the second position.

Under another aspect of the invention, a load warning system has an engagement portion movable with the vehicle-support portion or the frame of a vehicle. A load indicator is coupled to the other one of the vehicle-support portion or the frame. The load indicator is spaced apart from the engagement portion when in a first position. The load indicator is also configured to move to a second position and engage the engagement portion when the frame moves a selected distance relative to the vehicle-support portion in response to the load being applied to the load-support portion. The load support portion has a switch assembly and a trigger coupled to the switch assembly. The trigger is resiliently bendable against the engagement member after the load indicator is moved to the second position. A warning indicator is coupled to the load indicator and configured to provide an overload warning to a user in response to the load indicator moving to the second position.

DETAILED DESCRIPTION

Figure 1:
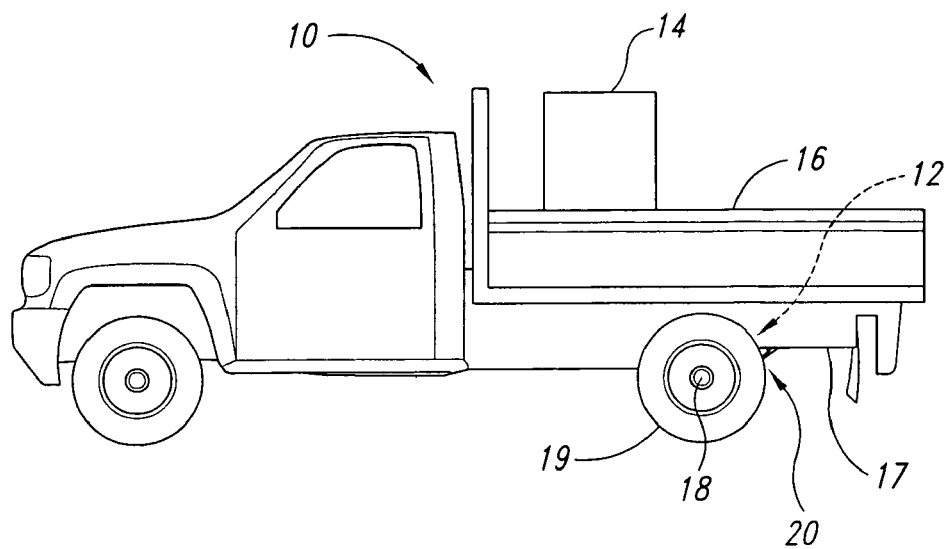
FIG. 1 is a side elevation view of a vehicle with a load warning system in accordance with an embodiment of the present invention.

The following discussion provides a general overview of the orientation and structure of the load warning system and associated components of one or more embodiments of the present invention. Throughout this disclosure, embodiments of the system are presented to display the robust nature of the device. FIG. 1 is a side elevation view of a vehicle 10 that includes a load warning system 12 in accordance with an embodiment of the invention. Details of embodiments of the load warning system 12 are provided below. The load warning system 12 provides an effective, simple and low-cost system to assist in maintaining safe loading conditions of the vehicle 10.

The vehicle 10 in the illustrated embodiment of FIG. 1 is a truck, such as a pickup or flatbed truck, having a bed 16 that defines a load support area. The bed 16 is mounted on a frame 17 of the vehicle, and the frame is coupled to axles 18 and wheels 19 in a conventional manner via a suspension system 20. The suspension system 20 allows the rear axle 18 and the bed 16 to move relative to each other, for example, when a load 14 is placed in the bed 16 or during the operation of the vehicle. When the load 14 is placed in the bed 16, the weight of the load compresses the suspension system 20, thereby moving the frame 17 relative to the rear axle 18. The heavier the load 14, the more the suspension system 20 will be compressed and the farther the bed 16 will move relative to the rear axle 18.

The load warning system 12 is configured to provide a warning signal to a user when the weight or the position of the load 14 in the bed 16 is sufficient to compress the suspension system 20 and move the frame 17 beyond a certain distance relative to the rear axle 18. The load warning system 12 is configured to provide a warning signal to a user when the weight of the load 14 exceeds a maximum weight, regardless of the load's position in the bed. The load warning system 12 is also configured to be activated if a certain load 14, which weights less than the maximum weight rated for the vehicle, is placed toward the rear of the bed 16. The load warning system 12 can also be configured to be activated if a certain load 14 less than the rated maximum weight is placed too far to one side of the bed 16. The load warning system 10 is also configured so it is less sensitive to weight that is placed in the cab of the truck, such as when a driver gets into a vehicle after it is loaded.

Figure 2:
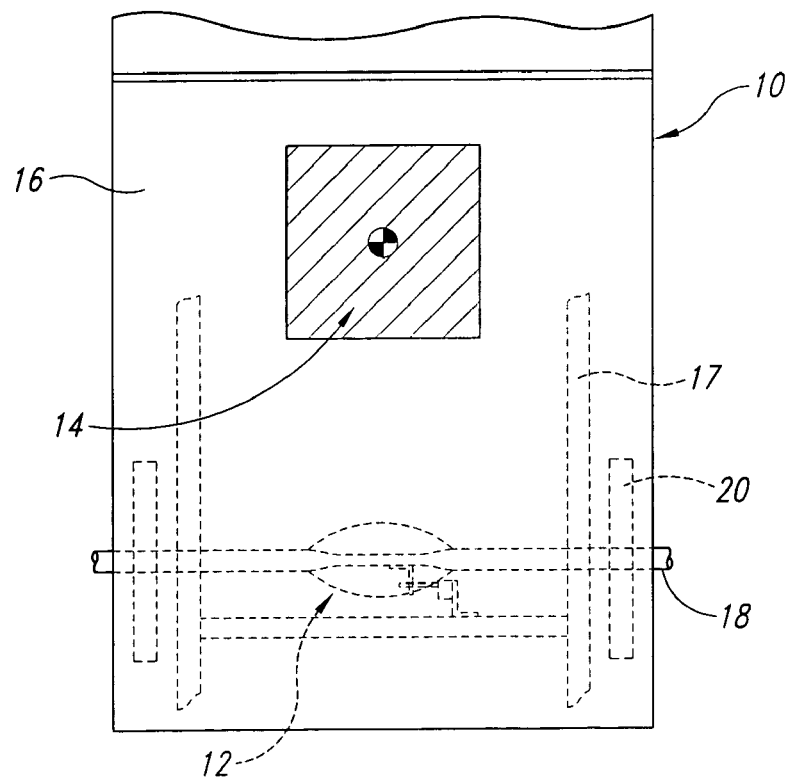
FIG. 2 is an enlarged partial schematic plan view of a load-support portion of the vehicle of FIG. 1 with a load thereon.

FIG. 2 is a schematic plan view showing the load 14 in the bed 16 of the vehicle 10 of FIG. 1. The load 14 can be distributed in the bed 16 in a variety of positions relative to the rear axle 18 of the vehicle 10. The position of the load 14 in the bed 16 can determine the extent to which the suspension system 20 is compressed and the rear portion of the frame 17 is moved relative to the rear axle 18. When the load 14 is directly over the rear axle 18 or rearward of the axle, the suspension system 20 will be compressed more and the frame 17 will move a greater distance relative to the rear axle than when the same load is in the forwardmost position in the bed 16. The load warning system 12 provides a warning signal when the load causes the frame 17 to move vertically or rotationally beyond a selected distance relative to the rear axle 18. The load warning system 12 could also be used in conjunction with other portions of the vehicle, such as the vehicle's front axle, to detect either underloading or overloading conditions based on the movement of the vehicle's frame 17 relative to a selected structure coupled to the suspension system 20.

Figure 3:
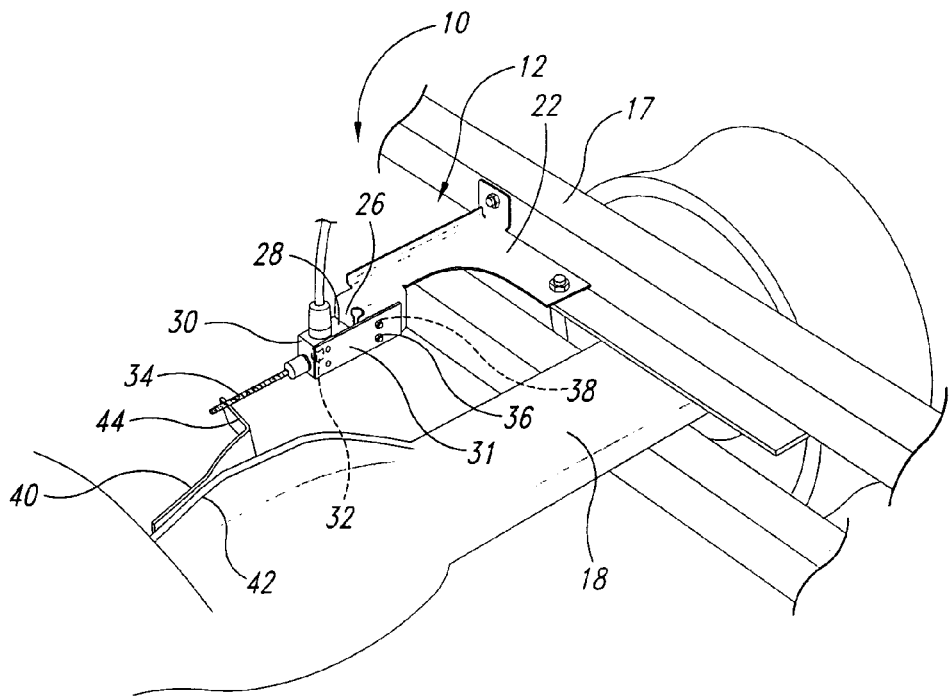
FIG. 3 is an enlarged top isometric view of the load warning system mounted on the vehicle of FIG. 1.
Figure 4:
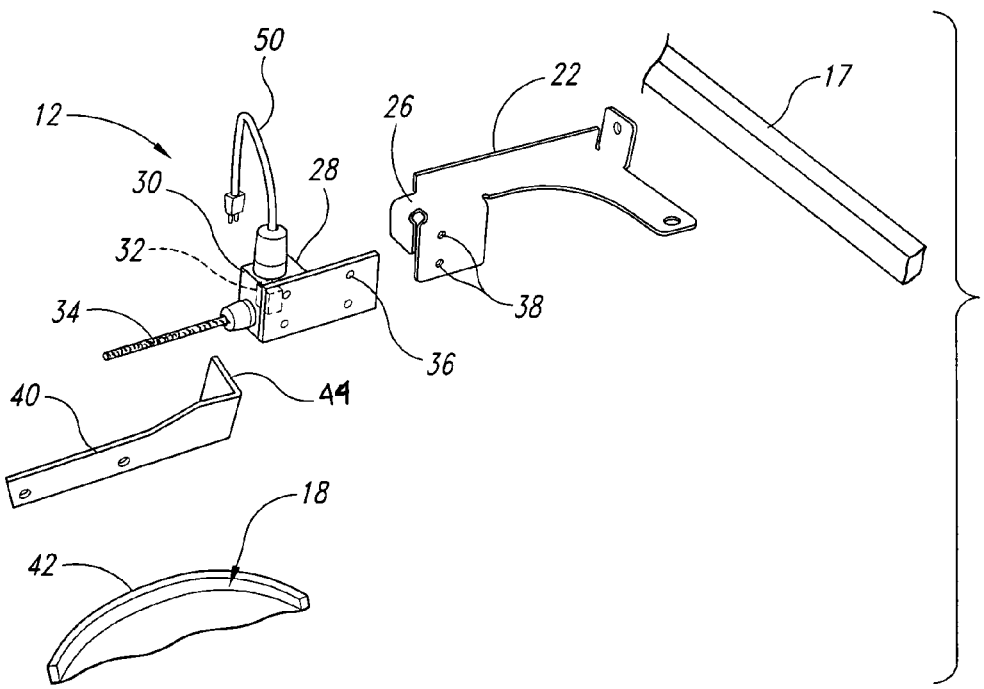
FIG. 4 is a partially exploded enlarged isometric view of components of the load warning system of FIG. 3 shown removed from the vehicle.

FIG. 3 is an enlarged top isometric view of the load warning system 12 shown installed on the vehicle 10 of FIG. 1 in accordance with one embodiment of the present invention. FIG. 4 is a partially exploded, enlarged isometric view of the components of the load warning system of FIG. 3 shown removed from the vehicle. The load warning system 12 of the illustrated embodiment includes a frame bracket 22 that mounts with conventional fasteners to the frame 17 of the vehicle 10. In the illustrated embodiment, the frame bracket 22 is mounted to the frame 17 above and rearward of the rear axle 18. The frame bracket 22 is bolted or otherwise securely mounted to the frame 17 so the frame bracket moves with the frame as a unit. The illustrated frame bracket 22 extends in a cantilevered manner from the frame 17.

A switch assembly 28 is adjustably connected to a free end 26 of the frame bracket 22. The frame bracket 22 is shaped and sized to securely support the switch assembly 28 at a selected location and orientation relative to the rear axle 18. In the illustrated embodiment, the switch assembly 28 is positioned rearward of the rear axle 18. The shape and size required for the frame bracket 22 may be affected by the make and model of the vehicle 10 to which the load warning system 12 is being installed. As an example, the frame bracket 22 shown in FIGS. 3 and 4 is shaped and sized for use on a truck manufactured by Ford, namely, a truck having the F34 cab chassis. In an alternate embodiment shown in FIG. 5, the frame bracket 22 is shaped and sized for use on GMC trucks. In other embodiments, different shapes and sizes of frame brackets 22 can be used with other vehicles. In yet other embodiments, the frame bracket 22 may be an integral component of the switch assembly 28.

Figure 5:
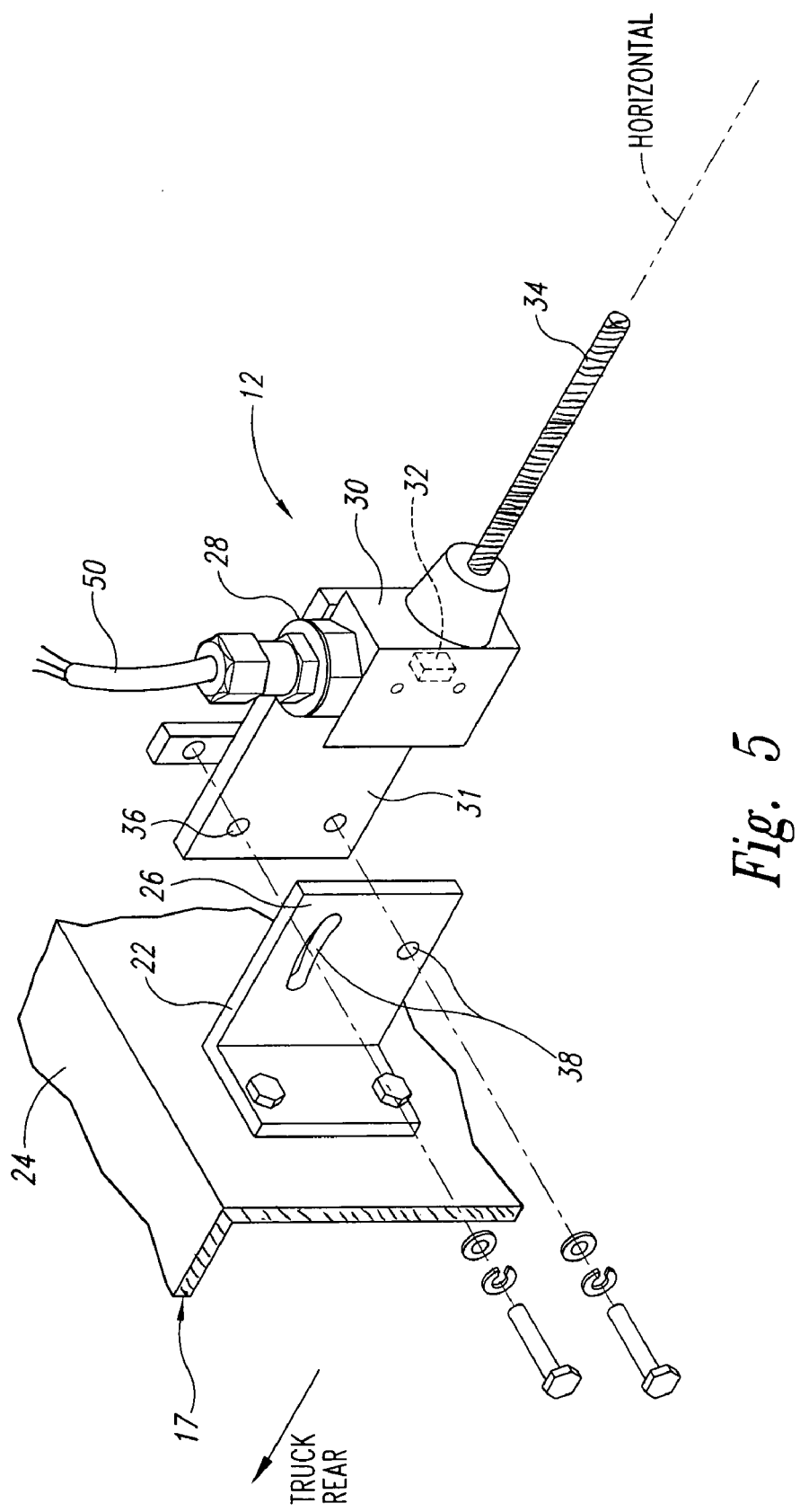
FIG. 5 is an enlarged isometric view of an alternate embodiment of the load warning system mountable on the vehicle of FIG. 1.

As best seen in FIGS. 3–5, the switch assembly 28 includes a sealed housing 30 connected to a mounting plate 31, and the mounting plate is fastened to the frame bracket 22. The sealed housing 30 contains a microswitch 32 movable between a normal inactive position and an activated position. The switch assembly 28 has a flexible trigger member 34 connected to the microswitch 32 and sealably coupled to the housing 30 so as to provide a fully protected environment for the microswitch. The microswitch 32 is moved from the normal, inactive position to the activated position by moving the trigger member 34 in any direction perpendicular to the trigger member's longitudinal axis.

The microswitch 32 in one embodiment is configured so the microswitch is open when in the normal, inactive position and closed when in the activated position. In this configuration, the switch assembly 28 draws no power when it is monitoring for overload condition. In the illustrated embodiment, the overload switch assembly 28 is a water-resistant assembly, such as the SWM 43 or 44 switch assembly manufactured by Precor, Inc. of Boise, Id. In alternate embodiments, other switch assemblies 28 can be used, including switch assemblies similar to the Precor switch assembly wired to be either in the "normally open" or "normally closed" position.

The mounting plate 31 extends from the sealed housing 30 and has a pair of apertures 36 that receive fasteners to connect to the free end 26 of the frame bracket 22. The free end 26 of the frame bracket 22 has corresponding receiving apertures 38 that align with the apertures 36 in the mounting plate 31. In the embodiment illustrated in FIGS. 3 and 4, the lower receiving aperture 38 in the frame bracket 22 is an elongated, arcuate slot that allows for adjustment of the angular orientation of the mounting bracket 31, and thus the switch assembly 28 relative to the frame 17.

In an alternate embodiment illustrated in FIG. 5, the frame bracket 22 is an L-shaped bracket with an arcuate-shaped upper aperture 38 that allows for the positional adjustment of the switch assembly 28. The position of the switch assembly 28 and the trigger member 34 can be adjusted as needed upon installation, maintenance, or calibration of the load warning system 12. In other embodiments, the switch assembly 28 can be adjustably connected to the frame bracket 22 in other manners that allow for angular or positional adjustment of the switch assembly relative to the frame bracket.

Once the switch assembly 28 is in the desired position relative to the frame bracket 22, the fasteners are securely tightened so as to hold the switch assembly in the selected position. The secured frame bracket 22 and the switch assembly 28 will move with the frame's cross member 24 as a unit relative to the rear axle 18, such as when the load 14 (FIG. 1) is placed in the bed 16 and the suspension system 20 is compressed.

Figure 6:
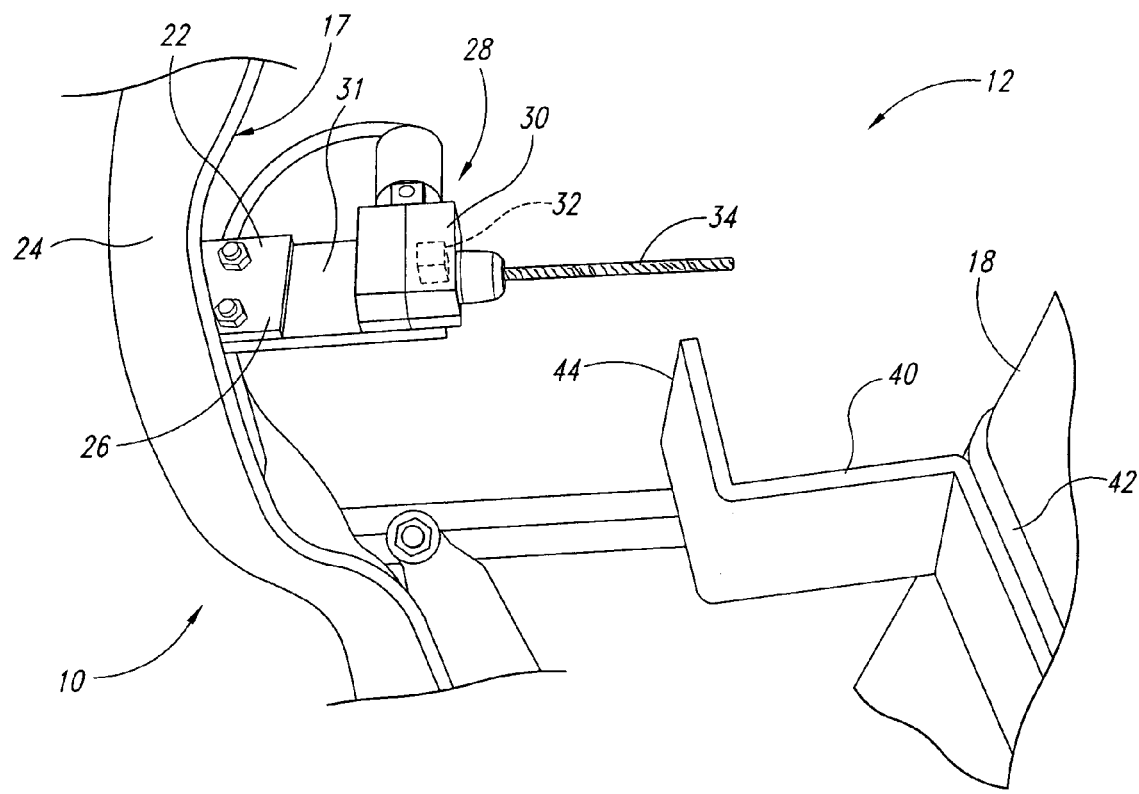
FIG. 6 is an enlarged bottom isometric view of components of an alternate embodiment of the load warning system on the vehicle of FIG. 1.

FIG. 6 is a bottom isometric view of an embodiment of components of the load warning system 12 configured for a selected vehicle configuration. The load warning system 12 includes a second bracket 40 mounted to the rear axle 18 in a position forwardly adjacent to and spaced apart from the trigger member 34. In the illustrated embodiment, the bracket 40 is securely bolted at one end to a bell housing 42 of the rear axle 18 and positioned below the trigger member 34 by a selected distance. Accordingly, the bracket 40 moves with the rear axle 18 as a unit.

The bracket 40 is cantilevered such that the bracket's free end provides an engagement portion 44 below the trigger member 34 (FIG. 6). The engagement portion 44 is positioned so the trigger member 34 presses against the engagement portion when the suspension system 20 is compressed and the frame 17 is moved beyond a selected distance relative to the rear axle 18. When the trigger member 34 is pressed against the engagement portion 44, the trigger member moves the microswitch 32 within the sealed housing 30 from the normal, inactive position to the activated position. Upon moving the microswitch 32 to the active position, a signal is generated that indicates a warning condition.

Operation of the switch assembly 28 is demonstrated when a load 14 (FIG. 2) is put into the bed 16 (FIG. 2) of the vehicle 10 (FIG. 2). The suspension system 20 (FIG. 2) will be compressed so that the cross member 24 and the switch assembly 28 move as a unit downwardly relative to the rear axle 18 and the bracket 40. When the weight and/or position of the load 14 in the bed 16 is such that the trigger member 34 moves toward the bracket's engagement portion 44 but does not press against it, the microswitch 32 in the switch assembly 28 remains in the normal, inactive position so a warning signal is not generated.

When a load 14 in the bed 16 (FIG. 2) exceeds a maximum weight rated for the vehicle 10, and the load is generally centered in the bed forward of the rear axle 18, the load causes the suspension system 20 (FIG. 2) to compress substantially vertically. As the suspension system 20 compresses, the trigger member 34 presses against the bracket's engagement portion 44, and the microswitch 32 is moved to the activated position, thereby indicating an overload condition. When a load 14 is placed in the bed 16 directly over the rear axle 18, the load can compress the suspension system 20 so the trigger mechanism 34 engages the bracket's engagement portion 44 to indicate an improper load condition, even though the load weighs less than the maximum weight rated for the vehicle.

When a load 14 is placed in the bed 16 behind the rear axle 18, the load will compress the suspension system 20 vertically and also cause the bed to slightly rotate about an axis of rotation generally close to the rear axle. As the bed rotates, the rear end of the bed drops and the front end of the vehicle 10 can be raised. As the bed 16 rotates relative to the rear axle 18 past a certain distance, it causes the trigger member 34 to engage the bracket's engagement portion 44. Such rotational motion will often occur when the load 14 is less than the maximum weight limit rated for the vehicle. In one embodiment, a load that is approximately 70% of the rated maximum load for the vehicle can activate the load warning system 12 and provide the warning of an improper load condition. Therefore, the load warning system 12 provides a warning when the load exceeds a rated maximum weight or when the weight and position of the load in the bed causes an undesirable loading condition even though the load is below the rated maximum load.

After the trigger member 34 has moved the microswitch 32 to the activated position, the microswitch will remain in the activated position until the load 14 (FIG. 2) is adjusted or reduced so the switch assembly 28 moves upwardly until the trigger member 34 is lifted out of engagement with the engagement portion 44 of the bracket 40. The microswitch 32 and the trigger member 34 are biased or otherwise urged toward the normal, inactive position. After the trigger member 34 is lifted from the engagement portion 44, the microswitch 32 returns to the normal, inactive position.

In the illustrated embodiments, the switch assembly 28 is activated by engaging the bracket 40. In alternate embodiments for use on selected vehicles, the switch assembly 28 may be configured and positioned adjacent to another structure on the vehicle 10, so that the trigger member 34 will move into engagement with that structure when a load is applied to the vehicle. The trigger member 34 will then trip the microswitch 32 so as to generate a warning signal indicating the improper load condition.

In another alternate embodiment, the switch assembly 28 may be mounted at another location on the vehicle 10 such that the frame 17 will move relative to the other location when a load 14 is applied to the vehicle. For example, the switch assembly 28 could be mounted to the front portion of the vehicle's frame 17 adjacent to the front axle, so the trigger member 34 is below an engagement structure. If the vehicle 10 is loaded such that the front of the vehicle's frame 17 is lifted upwardly relative to the front axle, the upward movement of the frame will bring the trigger member 34 into engagement with the engagement portion 44 of the bracket 40, thereby moving the microswitch 32 to the activated position to indicate an overload or underload configuration. Accordingly, the load warning system 12 is very effective when applying a load 14 to the bed 16 of a vehicle 10, as well as when other loads are applied to the vehicle's frame 17, such as via a trailer or the like.

As best seen in FIGS. 5 and 6, the trigger member 34 is an elongated flexible member that can resiliently bend when pressed with sufficient force against the bracket 40. The trigger member 34 of the illustrated embodiment is an elongated, tightly wound coil spring coupled to the microswitch 32. The microswitch 32 has a very small dead band (i.e., the range of motion before the microswitch moves to the activated position), so that the microswitch can be moved to the activated position when a fairly small force is exerted against the trigger member 34.

The flexible trigger member 34 has sufficient stiffness so it will not substantially bend or deflect before the microswitch 32 is moved to the activated position. If, however, the movement of the vehicle's frame 17 relative to the rear axle 18 is extreme, so that the trigger member 34 is pressed hard against the bracket's engagement portion 44, the trigger member will resiliently bend so as to prevent extreme forces being applied directly to the microswitch 32. Further, when the vehicle 10 (FIG. 2) is in operation and encounters significant impact to the suspension system 20

(FIG. 2), such as by hitting a large bump or pot hole, the flexible trigger member 34 can hit and bend against the engagement portion 44 and then return to its original position, thereby protecting the switch assembly 28 from damage. Accordingly, the switch assembly 28 is a simple, rugged, and weather-resistant assembly.

As best seen in FIGS. 4 and 5, the switch assembly 28 has an electrical cable 50 extending through the housing 30 and connected at one end to the microswitch 32. A seal is provided between the electrical cable 50 and the housing 30 to maintain the sealed environment in the housing around the microswitch 32. In one embodiment, the electrical cable 50 has a pair of mating connectors 60 and 62 (FIG. 7) releasably connected to each other adjacent to the switch assembly 28. In one embodiment, a short length of heat-shrink tubing is provided over both connectors 60 and 62.

Figure 7:
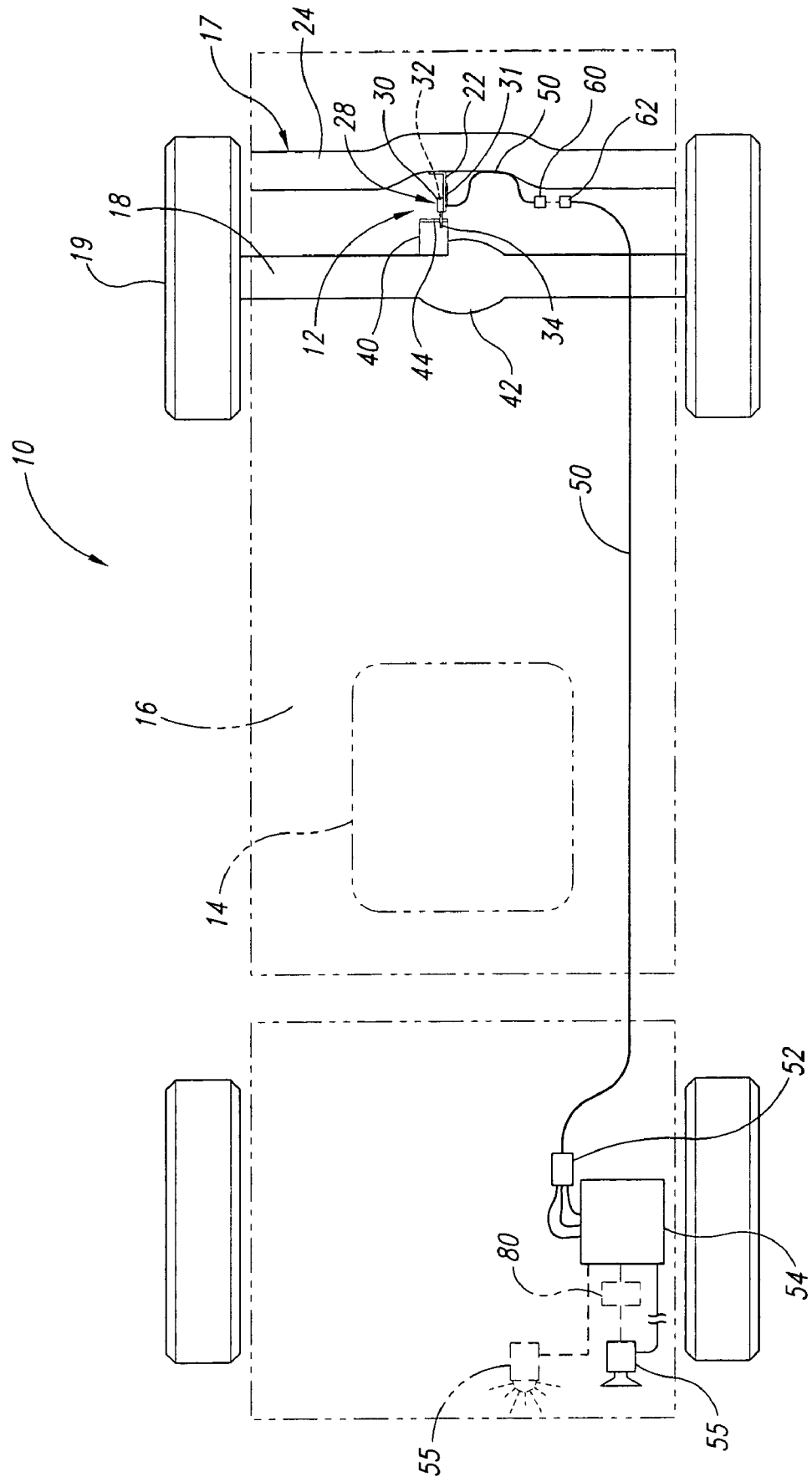
FIG. 7 is a schematic plan view of the load warning system on the vehicle of FIG. 1 showing wire routing along the vehicle.

FIG. 7 is a schematic view showing the electrical cable 50 routed along selected portions of the vehicle 10 and connected to the vehicle's electrical center 54. In one embodiment, the electrical cable 50 extends from the switch assembly 28 and is routed along the existing vehicle's wire bundles, such as along the driver's side. The electrical cable 50 is secured to the vehicle's wire bundles using conventional wire ties or other conventional securing mechanisms.

The end of the electrical cable 50 opposite the switch assembly 28 is attached to a relay assembly 52 that connects to the electrical center 54. The relay assembly 52 is coupled to a warning indicator 55. Accordingly, when an improper load condition exists and the trigger member 34 causes the microswitch 32 to move to the activated position, the signal generated from the microswitch is provided to the relay assembly 52. The relay assembly 52 provides a signal to the electrical center 54 so as to activate the warning indicator 55 so as to provide an audible and/or visual warning to the user that the improper load condition has occurred.

In one embodiment, the relay assembly 52 is connected to the electrical center 54 so as to activate an audible warning indicator 55, such as the vehicle horn or an auxiliary horn, that generates a sound indicating that an improper load condition exists. The audible warning indicator 55 will continue to sound until the load is lessened or shifted so as to move the microswitch 32 back to the normal, inactive position. In an alternate embodiment, a visual warning indicator, such as flashing vehicle lights or an auxiliary warning light, will appear to indicate that an improper load condition exists. In yet another alternate embodiment, both audible and visual warning indicators can be used.

Figure 8:
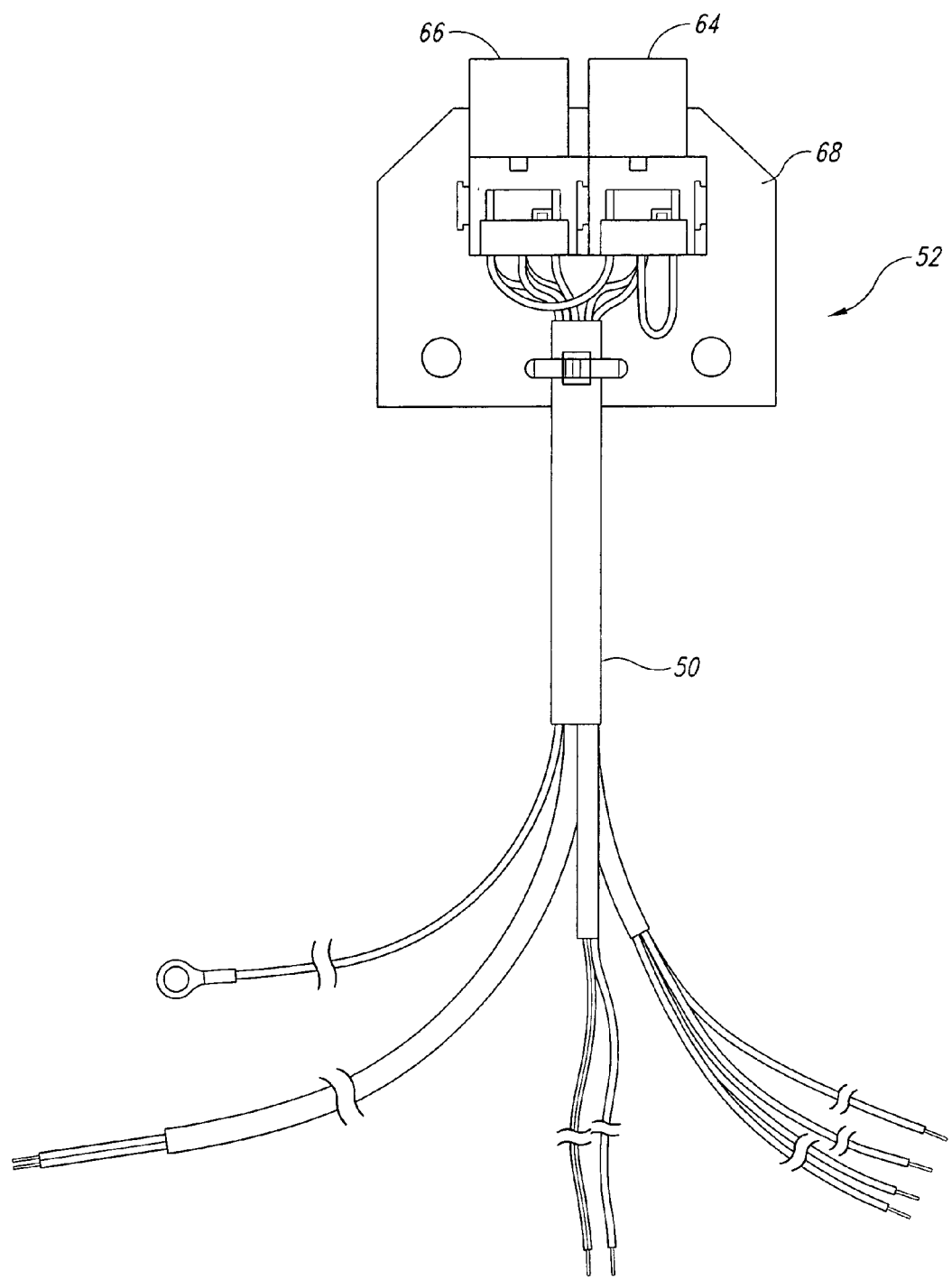
FIG. 8 is an enlarged plan view of a relay assembly of the electrical components of the load warning system of FIG. 1.

As best seen in FIG. 8, the relay assembly 52 includes two relays 64 and 66 mounted on a mounting plate 68. The first relay 64 connects to the vehicle's start relay in the electrical center 54 (FIG. 7), and the second relay 66 connects to the vehicle's horn relay, also in the electrical center. The relay assembly 52 is configured so that, when the switch assembly 28 (FIG. 7) is activated, the vehicle's horn will sound until the improper load condition has been corrected. The second relay 664 is configured so the load warning system 12 (FIG. 7) will only provide the audible warning signal, e.g., sounding the vehicle's horn, when the vehicle is in park or neutral. If the vehicle 10 is in reverse or any drive gear, the load warning system 12 will not sound the horn if an improper load condition exists. When the vehicle 10 is being driven and it hits a large bump, the load warning system 12 of the illustrated embodiment will not sound the horn.

As indicated above, the load warning system 12 draws no power when in the normal, inactive position, such that there is no drain on the vehicle's battery, and no current flows through the starter relay unless the ignition key activates the starter. Accordingly, the load warning system 12 of the illustrated embodiment has no separate ON/OFF switch, no lights to manually turn on or off, and nothing for the operator to do except to reduce or shift the load 14 on the vehicle 10 when the load warning system 12 indicates an improper load condition has occurred.

In an alternate embodiment of the invention, the relay assembly 52 can be coupled to a different audible warning device, such as an alarm, or to a visible warning indicator mechanism, such as a warning light or the like. In another embodiment, the load warning system can bypass the starter relay, and the system includes a data processor 80 (shown in phantom lines in FIG. 7) operatively coupled to the switch assembly 28. The processor 80 is configured to provide continual monitoring of the switch assembly 28 to determine the frequency and/or duration of time that the microswitch 32 is in the activated position while the vehicle is stationary or being driven. When a selected condition exists, such as a number of activations over a selected period or specified duration of time that the microswitch 32 remains in the activated position, the processor 80 will provide a signal to activate the warning indicator 55. In this embodiment, if the vehicle 10 is in motion and the trigger member 34 is occasionally activated because of road disturbances, the processor 80 will be able to identify these occasional activations without activating the warning indicator 55. If, as an example, the load 14 in the vehicle 10 shifts during transportation, thereby resulting in substantially continuous activation of the microswitch 32 to indicate an improper load condition, the processor 80 would detect the change and a warning signal would be provided to the user that an improper load condition exists.

When the load warning system 12 is installed on the vehicle 10 either as original equipment or as a retrofit, the system is calibrated to provide a warning signal when the load exceeds a selected maximum load. The load warning system 12 can be easily and quickly calibrated by placing a known maximum load 14 into the bed 16 of the vehicle 10 at a selected location and then adjusting the position of the switch assembly 28 relative to the bracket 40. In one embodiment shown in FIG. 2, the calibration load 14 is 3,000 pounds±30 pounds. The load 14 has a footprint of approximately 30"×30", and the load is placed so the load's center is approximately 26"±3" behind the front of the bed 16. The load 14 is centered laterally within approximately 2" of the vehicle's centerline.

As best seen in FIG. 3 from under the vehicle 10, the fasteners connecting the switch assembly 28 to the frame bracket 22 are then loosened. The switch assembly 28 is then rotated until the trigger member 34 contacts the engagement portion 44 of the bracket 40 just enough so that the microswitch 32 moves to the activated position thereby sounding the horn. The switch assembly 28 is then secured in this position relative to the frame bracket 22, so as to be in a final calibrated position. After the switch assembly 28 is secured in the final calibration position, a person should be able to push upwardly on a portion of the frame 17 rearward of the rear axle 18 enough to cause the trigger member 34 to move the microswitch 32 back to the normal, inactive position.

The configuration of the load warning system 12 on the vehicle 10 as discussed above is such that the location of the measurement point determines how the system will react as the center of gravity of the load 14 is moved around on the bed 16 or other load support area of the vehicle. The load warning system 12 is configured to minimize the effect of a driver's weight. The load warning system 12 of the illustrated embodiment is also configured to generate the warning signal in the event a reduced load, such as approximately 70% of the maximum load, is placed too far rearward in the bed 16 of the vehicle 10. In this configuration, the reduced load will cause the compression of the suspension system 20 and rotation of the frame 17 relative to the rear axle 18, thereby indicating an improper load configuration. In this overload configuration, the load rearward of the rear axle 18 can cause the forward portion of the vehicle's frame 17 to lift so as to reduce the weight on the vehicle's front wheels, thereby resulting in the overload condition at the rear end and an undesirable underload condition at the forward end of the vehicle.

After the load warning system 12 is calibrated, the calibration load is removed from the bed 16 and the vehicle 10 can be used in regular operation. The load warning system 12 can be easily recalibrated as needed, for example, if the vehicle's suspension system 20 relaxes or softens over time. The load warning system 12 can also be easily and quickly tested by reaching under the vehicle 10 and manually moving the trigger member 34 to confirm that the warning signal will be generated in an improper load condition. If any system components have been damaged, or require replacement or maintenance, such as the microswitch 32, the flexible trigger member 34, the brackets 22 and 40, the electrical cable 50 or the like, the component can be quickly and easily removed and replaced, thereby minimizing the amount of time the vehicle is out of service.

In one embodiment, the load warning system 12 includes a data collector 70, shown schematically in FIG. 7, operatively connected to the vehicle 10 and to the switch assembly 28. The data collector 70 is configured to collect data during operation of the vehicle, and the data can be downloaded or otherwise output for analysis. The data collector 70 can be configured to collect and output data, including, for example, the time, date and duration of operation, or the frequency or duration of activation of the switch assembly. The data collector 70 can also be connected to a conventional load cell (not shown) to collect and output data about the weight of the load(s) applied to the vehicle 10.

The data from the data collector 70 can then be used in any number of ways, including determining when routine maintenance may be needed for the load warning system 12. If the vehicle is a rental vehicle, the data collector 70 could be used to determine whether conditions existed during operation that justifies different charges or costs to the renter of the vehicle. Accordingly, the load warning system 12 can be used for more than just determining if an improper load condition exists.

From the above detailed description, it will be appreciated that specific embodiments of the invention are described herein for purposes of illustration, but that various modifications may be made without deviating from the spirit and scope of the invention.

We claim:

1. A vehicle and load warning system, comprising:
a vehicle having a load-support portion adapted to receive a load thereon, a frame coupled to the load-support portion, and a vehicle-support portion coupled to the frame, the frame being movable relative to the vehicle-support portion;
an engagement portion movable with one of the vehicle-support portion or the frame;
a load indicator coupled to another one of the vehicle-support portion or the frame, the load indicator spaced apart from the engagement portion when in a first position and configured to move to a second position and engage the engagement portion when the frame moves a selected distance relative to the vehicle-support portion in response to the load being applied to the load-support portion, the load indicator having a sensor assembly and a trigger coupled to the sensor assembly, the trigger being resiliently bendable against the engagement portion after the load indicator is moved to the second position; and
a warning indicator coupled to the load indicator and configured to provide a warning to a user in response to the load indicator moving to the second position.

2. The system of claim 1 wherein the engagement portion is at least a portion of a bracket attached to the one of the vehicle-support portion or the frame.

3. The system of claim 1 wherein the frame is rotatable relative to the vehicle support about an axis of rotation when the load is rearward of the axis of rotation, and at least one of the engagement portion and the load indicator is positioned rearward of the axis of rotation.

4. The system of claim 1 wherein the vehicle support portion includes a rear axle assembly, and at least one of the engagement portion and the load indicator is mounted to the rear axle assembly, and the other of engagement portion and the load indicator is positioned generally rearward of the rear axle assembly.

5. The system of claim 1 wherein the load indicator includes a mounting bracket attached to the other one of the vehicle-support portion or the frame, and the sensor assembly is adjustably attached to the mounting bracket.

6. The system of claim 1 wherein the vehicle has a power source, the load indicator is coupled to the power source and draws power from the power source only when the load indicator is in the second position.

7. The system of claim 1, further comprising a data collector coupled to the vehicle and configured to collect and output data including at least one of time, date, load, activation of the warning indicator, and duration of use of the system.

8. The system of claim 1 wherein the warning is an audible warning.

9. The system of claim 1 wherein the warning indicator is a visual overload indicator.

10. The system of claim 1 wherein the warning indicator includes a horn, and the signal from the load indicator activates the horn to provide the warning to the user.

11. The system of claim 1 wherein the vehicle has an electrical control with a starter relay, and further comprising a relay assembly coupled to the load indicator and to the starter relay.

12. The system of claim 11 wherein the relay assembly is configured to allow for generation of the warning when the vehicle is in a park or neutral gear condition.

13. The system of claim 1, further comprising a control system coupled to the load indicator and to the warning system, the control system being configured to monitor a frequency or duration of the signals from the load indicator and to block the signal from reaching the warning indicator until a selected condition of frequency or duration of the signals exists.

14. The system of claim 1 wherein the load-support portion of the vehicle is a rear axle coupled to the frame by a suspension system.

15. The system of claim 1 wherein the sensor assembly includes a housing and a switch in the housing, the switch being coupled to the trigger.

16. A vehicle and load warning system, comprising:
a vehicle having a load-support portion adapted to receive a load thereon, a frame coupled to the support portion, and a vehicle-support portion coupled to the frame, the frame being vertically movable relative to the vehicle support portion and being rotatable about a point of rotation relative to the vehicle support portion;
an engagement portion movable with one of the vehicle-support portion or the frame;
a load indicator coupled to another one of the vehicle-support portion or the frame, the load indicator spaced apart from the engagement portion when in a first position and configured to move to a second position and engage the engagement portion when the frame moves vertically and rotationally a selected distance relative to the vehicle-support portion in response to the load being applied to the load-support portion, the load indicator having a sensor assembly and a trigger member coupled to the sensor assembly, the sensor assembly is spaced laterally apart from the engagement portion so as to be out of vertical alignment with the engagement portion, at least a portion of the trigger member is in vertical alignment with the engagement portion and being directly engagable with the engagement portion; and
a warning indicator coupled to the load indicator and configured to provide a warning to a user in response to the load indicator moving to the second position.

17. The system of claim 16 wherein the engagement portion is at least a portion of a bracket attached to the one of the vehicle-support portion and the frame.

18. The system of claim 16 wherein the sensor assembly includes a switch and the trigger is a flexible trigger member coupled to the switch and resiliently bendable against the engagement member after the load indicator is moved to the second position.

19. The system of claim 16 wherein the load indicator includes a mounting bracket attached to the other one of the vehicle-support portion or the frame, and the sensor assembly is adjustably attached to the mounting bracket.

20. The system of claim 16 wherein the warning is an audible or visual warning.

21. The system of claim 16 wherein the vehicle has an electrical control with a starter relay, and further comprising a relay assembly coupled to the load indicator and to the starter relay.

22. The system of claim 21 wherein the relay assembly is configured to allow for generation of the warning when the vehicle is in a park or neutral gear condition.

23. The system of claim 16, further comprising a control system coupled to the load indicator and to the warning system, the control system being configured to monitor a frequency or duration of the signals from the load indicator and to block the signal from reaching the warning indicator until a selected condition of frequency or duration of the signals exists.

24. The system of claim 16 wherein the load-support portion of the vehicle is a rear axle coupled to the frame by a suspension system.

25. The system of claim 16 wherein the vehicle has a power source, the load indicator is coupled to the power source and draws power from the power source only when the load indicator is in the second position.

26. The system of claim 16, further comprising a data collector coupled to the vehicle and configured to collect and output data including at least one of time, date, load, activation of the warning indicator, and duration of use of the system.

27. The system of claim 16 wherein the sensor assembly includes a housing and a switch in the housing, the switch being coupled to the trigger.

28. A vehicle and load warning system, comprising:
a vehicle having a load-support portion adapted to receive a load thereon, a frame coupled to the support portion, and a vehicle-support portion coupled to the frame, the frame being movable relative to the vehicle support portion;
an engagement portion movable with one of the vehicle-support portion or the frame;
a load indicator coupled to another one of the vehicle-support portion or the frame, the load indicator spaced apart from the engagement portion when in a first position and configured to move to a second position and engage the engagement portion when the load applied to the load-support portion exceeds a first maximum load, and the load indicator is configured to rotate and move vertically relative to the another one of the vehicle support or the frame to the second position and engage the engagement portion substantially along a point contact when the load applied to the load-support portion exceeds a second maximum load less than the first maximum load and the load is positioned rearward of the at least one of the load indicator and the engagement portion; and
a warning indicator coupled to the load indicator and configured to provide a warning to a user in response to the load indicator moving to the second position.

29. The system of claim 28 wherein the vehicle has a power source, the load indicator is coupled to the power source and draws power from the power source only when the load indicator is in the second position.

30. The system of claim 28 wherein the load indicator includes a switch and a flexible trigger member coupled to the switch and resiliently bendable against the engagement member after the load indicator is moved to the second position.

31. The system of claim 28 wherein the warning is an audible or visual warning.

32. The system of claim 28 wherein the vehicle has an electrical control with a starter relay, and further comprising a relay assembly coupled to the load indicator and to the starter relay.

33. The system of claim 32 wherein the relay assembly is configured to allow for generation of the overload warning when the vehicle is in a park or neutral gear condition.

34. The system of claim 28, further comprising a control system coupled to the load indicator and to the warning system, the control system being configured to monitor a frequency or duration of the signals from the load indicator and to block the signal from reaching the warning indicator until a selected condition of frequency or duration of the signals exists.

35. A load warning system for use with a vehicle having a load-support portion adapted to receive a load thereon, a frame coupled to the load-support portion, and a vehicle-support portion movably coupled to the frame, comprising:
an engagement portion mountable to one of the vehicle-support portion or the frame and being movable with the one of the vehicle-support portion or the frame as a unit;
a load indicator mountable to another one of the vehicle-support portion or the frame, the load indicator spaced apart from the engagement portion when in a first position and configured to move to a second position and engage the engagement portion when the frame moves a selected distance relative to the vehicle-support portion in response to the load being applied to the load-support portion, the load support portion having a switch assembly and a trigger coupled to the switch assembly, the trigger being resiliently bendable against the engagement member after the load indicator is moved to the second position; and a warning indicator coupled to the load indicator and configured to provide an overload warning in response to the load indicator moving to the second position.

36. The system of claim 35 wherein the engagement portion is at least a portion of a bracket mounted on the one of the vehicle-support portion and the frame.

37. The system of claim 35 wherein the load indicator is connectable to a power source and draws power from the power source only when the load indicator is in the second position.

38. The system of claim 35 wherein the load indicator includes a sealed housing, a switch in the sealed housing, and a flexible trigger resiliently bendable against the engagement member after the load indicator is moved to the second position.

39. The system of claim 35 wherein the overload warning is an audible or visual warning.

40. The system of claim 35 wherein the warning indicator includes at least one of an audible indicator and a visual indicator.

41. The system of claim 35 wherein the vehicle has an electrical control with a starter relay, and further comprising a relay assembly coupled to the load indicator and to the starter relay, the relay assembly configured to allow for generation of the overload warning when the vehicle is in a park or neutral gear condition.

42. The overload warning system of claim 35, further comprising a control system coupled to the load indicator and to the overload warning system, the control system configured to monitor at least one of the frequency or duration of the signals from the load indicator and to block the signal from reaching the overload warning indicator until a selected condition of frequency or duration of the signals exists.

43. The system of claim 35 wherein the sensor assembly includes a housing and a switch in the housing, the switch being coupled to the trigger.

44. A load warning system for use with a vehicle having a load-support portion adapted to receive a load thereon, the vehicle having a first portion coupled to the load-support portion and a second portion movable relative to the first portion upon application of a selected load on the load-support portion, comprising:

an engagement portion movable with the one of the vehicle-support portion or the frame;

a load indicator coupled to another one of the vehicle-support portion or the frame, the load indicator spaced apart from the engagement portion when in a first position and configured to move to a second position and engage the engagement portion when the load applied to the load-support portion exceeds a first maximum load, and the load indicator is configured to rotate and move vertically relative to the another one of the vehicle support or the frame to the second position and engage the engagement portion substantially along a point contact when the load applied to the load-support portion exceeds a second maximum load less than the first maximum load and the load is positioned rearward of the at least one of the load indicator and the engagement portion; and a warning indicator coupled to the load indicator and configured to provide a warning to a user in response to the load indicator moving to the second position.

45. The system of claim 44 wherein the engagement portion is a bracket adjustably mounted on the one of the first or second portions.

46. The system of claim 44 wherein the load indicator includes a trigger resiliently bendable against the engagement member after the load indicator is moved to the second position.

47. The system of claim 44 wherein the load indicator includes a mounting bracket and a switch assembly adjustably attached to the mounting bracket.

48. The system of claim 44, further comprising a control system coupled to the load indicator and to the warning indicator, the control system being configured to monitor the frequency or duration of the signals from the load indicator and to block the signal from reaching the warning indicator until a selected condition of frequency or duration of the signals exists indicating an overload condition.

49. A vehicle and overload warning system, comprising:

a vehicle having a power source, an electrical control with a starter relay, a load-support portion adapted to receive a load thereon, a first portion coupled to the support portion, and a second portion movable relative to the first portion upon application of the load on the load-support portion;

an engagement portion connected to one of the first or second portions;

a load indicator coupled to the power source and connected to another one of the first or second portions, the load indicator spaced apart from the engagement portion and in a first position when the load on the load-support portion is less than a maximum load, and the load indicator being configured to engage the engagement portion and to move to a second position when the load on the load-support portion is greater than the maximum load, the load indicator drawing power from the power source when in the second position and drawing no power from the power source when in the first position;

a warning indicator coupled to the load indicator and configured to provide a warning to a user in response to the load indicator moving to the second position; and a relay assembly coupled to the load indicator and to the starter relay; the relay assembly being configured to allow for generation of the warning when the vehicle is in a park or neutral gear condition.

50. The system of claim 49 wherein the load indicator is a sensor assembly having a trigger resiliently bendable against the engagement member after moving to the second position.

51. The system of claim 49 wherein the load indicator is adjustably mounted to the other one of the first and second portions of the vehicle.

52. The system of claim 49 wherein the warning indicator generates at least one of an audible overload warning or a visible overload warning.

* * * * *